Patented Oct. 22, 1929

1,733,070

UNITED STATES PATENT OFFICE

DONALD K. PATTILLO, OF FULTON, AND JAMES H. MacMAHON, OF NIAGARA FALLS, NEW YORK, ASSIGNORS, BY DIRECT AND MESNE ASSIGNMENTS, TO THE MATHIESON ALKALI WORKS, INC., OF NEW YORK, N. Y., A CORPORATION OF VIRGINIA

OPERATION OF PAPER MILLS

No Drawing.   Application filed December 23, 1927.   Serial No. 242,159½.

This invention relates to improvements in the operation of paper mills.

In paper mill operation considerable loss occurs in the so-called white water discharged from the mill; and the slime problem is one of the serious problems met with in paper mill operation.

The present invention provides an improved process in which the losses in the white water are largely eliminated and in which a valuable product is recovered from the white water having improved properties and advantages.

Our investigation of the slime problem in paper mill operation indicates that slimes are due to bacterial action and that different classes of bacterial growths should be distinguished. Certain slimes are caused by bacterial growths or algæous growths in the water supply, while others are due to bacterial growth, for the most part putrefactive and pathogenic, in the raw materials, which may at times be supplemented by the algæous growth in the raw materials. Pitches or "beater gum" which form for the most part in beating engines and subsequent stock chests differ from slime in that they are denser and usually of a much darker color and for the most part contain sulfides. They have the characteristics of a dehydrated slime.

We have found that the paper making operation can be benefited by a regulated chlorine treatment of the stock prior to the paper making operation, and that the stock can be effectively sterilized and the slime problem overcome by such treatment; and that the white water from such paper making operation can advantageously be coagulated to give an improved product of stable and sterilized character which can be stored and kept without undergoing objectionable decomposition.

According to the present invention we subject the pulp or stock at some point in the mill prior to the paper making operation to the action of chlorine in regulated amount so that there will be a small but definite residual chlorine content in the water of the treated stock or pulp. Thereby we effectively sterilize the stock from which the paper is made. Where water is added to the stock subsequent to the chlorine treatment the water is also sterilized by treatment with chlorine so that it will also have a small but definite content of residual chlorine. This preliminary chlorine treatment benefits the paper making operation in various ways. It destroys the bacterial growth and improves the operation of forming the paper on the paper machine, cutting down the time required for cleaning, and giving a sterilized paper.

The white water separated from the paper is in a sterilized condition and it is subjected to a coagulating treatment to separate therefrom the coagulatable material made up of short fibres and colloid material of a coagulable character. The coagulated material can then be separated from the white water and obtained for example in the form of laps on a wet machine, which can be stored in a wet state or dried for shipment. The product so obtained is in a sterile condition and therefore it can be stored and kept without objectionable decomposition such as accompanies coagulated products produced from white water according to methods heretofore proposed. The new coagulated and recovered product is therefore a superior product of a stable character and can be stored and shipped, either in an undried or in a dried state, and subsequently employed for purposes for which it is adapted.

The white water from which the coagulated material has been separated is itself in a sterile condition and can be used over again to a greater or less extent as mill water in the further operation of the mill.

The sterilization of the pulp or stock prior to the paper making operation can be carried out in different ways and at different points in the paper mill operation. With certain pulp, such as ground wood pulp or sulfite pulp, the pulp is advantageously subjected to a preliminary chlorine treatment so as to leave in it a small residual chlorine content which will cause the pulp to be sterilized before it enters the paper mill. With other stocks the treatment can be carried out in the paper mill itself. In general, the chlorine treatment should be such as will sterilize the water and destroy slime forming bacteria without attacking the fibres to an objectionable extent.

We have found that the sterilization of the stock can advantageously be effected at a point of high dilution of the stock, such as in the mixing box ahead of the paper machine. In the mixing box the pulp is highly diluted with water and contains only around 1% or less of actual pulp. In such a diluted stock the chlorine will effectively sterilize the stock without attacking the fibres.

The chlorine treatment of the stock can be carried out with gaseous chlorine introduced directly into the stock or with the introduction of chlorine water or a solution of hypochlorous acid or a hypochlorite. A particularly advantageous method of introducing the chlorine is by combining the chlorine continuously with water in regulated amount and introducing the chlorinated water into the stock.

The chlorination is advantageously effected continuously by adding a regulated stream of chlorine water to the pulp flowing through the mixing box. The amount of chlorine should be such as will give a residual chlorine content in the stock or fibre-water mixture of around one-half part to one part per million of water as determined by the standard ortho-tolidine test of the American Public Health Association. Where raw water is added to the "showers" to dilute the pulp it should also be chlorinated so as to leave a similar residual chlorine content therein. The amount of chlorine required for the chlorination will vary with different stocks and different raw water supplies, but it can readily be regulated by testing for residual chlorine content and insuring the presence of residual chlorine to the extent indicated in the stock going to the paper machine.

After the formation of the paper in the paper machine the white water may in part be employed in the mill and will have the advantage of being a sterilized white water. The white water which is not used in the mill is treated for the coagulation of short fibrous materials and other coagulatable materials. This treatment may take place in the save-all or in other apparatus and the operation may be of a continuous character or carried out intermittently.

Different coagulating materials can be employed, either singly or in combination, for treating the white water. Among the coagulating materials may be mentioned alum, alum and sodium aluminate, alum and caustic soda, ferric chloride, etc. The amount of coagulating material needed can readily be determined by testing a sample of the white water with the coagulant. We have found around two pounds of alum per thousand gallons of white water effective in some cases or similar amounts of the other coagulating agents mentioned. The coagulant can be added in solution or added in solid form and dissolved in the white water with agitation to insure uniform dstribution throughout the liquor.

We have found it important to regulate the pH value of the white water to secure effective coagulation. This value can readily be controlled by controlling the character and amount of the coagulant or the amount of residual chlorine present or by adding electrolytes of suitable character. The white water obtained from stock treated with chlorine as hereinbefore described and having a residual chlorine content of around one-half part to one part per million is in a condition well adapted for coagulation. In white water which we have coagulated we have found a pH value of around 5.5 to 6.5 most effective for the coagulation and that the coagulation is more effective in the presence of a small amount of residual chlorine which appears to serve as a catalyst in promoting the coagulation.

The coagulated product is advantageously separated from the white water on a wet machine or a similar machine. Although the coagulated material is largely of a colloidal character it can nevertheless be readily separated from the white water on a wet machine and obtained in the form of laps similar to laps of ordinary pulp produced on a wet machine, and the laps can be stored and kept in a wet state or dried to a greater or less extent, particularly in case of shipment.

The new coagulated product, because of its stable and sterible character, can be used either at the same mill where it is formed or shipped to other mills. Because of its content of short fibres and of coagulated colloid material it is well adapted for use in admixture with longer fibre stock in making certain grades of paper. It can, for example, be added to the beater or to some other point in the flow of the stock through the paper mill and in that way admixed with the stock so that it will form part of the paper subsequently produced on the paper machine. For certain grades of paper the presence of the coagulated material is desirable. The separate production of this coagulated material enables it to be blended and used on certain grades of stock when these are being manufactured while for other stocks in which it is undesirable or less valuable it can be omitted. Its stable and sterile character permits it to be stored and kept and employed for the particular grades of paper for which it is best suited. In this respect the new coagulated product has important advantages over unsterilized and unstable coagulated products which deteriorate rapidly and which cannot be stored or kept for any considerable time.

Where the paper being manufactured continuously on the paper machine is paper in which the coagulated material can advantageously be incorporated it may be returned directly from the coagulating and separating step to the stock going through the mill. The coagulated material separated on the wet machine may, for example, be passed to the beater and there incorporated with the other fibres which go to make up the stock for the paper machine. In this way the coagulated material is continuously recovered and incorporated in the paper. By treating the white water in this way and obtaining a slime-free, stable, coagulated product and returning it and incorporating it with the stock flowing through the mill the total amount of paper produced can be considerably increased and the loss of paper stock in the white water greatly reduced.

The white water, as above stated, is of a sterile character and can advantageously be returned to the mixing box or to the beater and used in the further operation of the mill, thus giving to a greater or less extent a closed cycle of operations and reducing the amount of fresh water required for the mill operation. The sterile character of the white water so returned makes unnecessary the addition of further chlorine to sterilize it, thus further economizing in the amount of chlorine required for insuring sterile stock going to the paper making machine.

It will thus be seen that the present invention provides an improved method of operating a paper mill in which losses in the white water are eliminated or greatly reduced and in which the material recovered from the white water in a coagulated state is in a stable and sterile condition, well adapted for use in the production of paper. It will further be seen that the process includes improvements in the production of paper and in the operation of the paper mill such that trouble from slime is prevented or reduced to an unobjectionable extent.

We claim:

1. The improvement in the operation of paper mills which comprises subjecting the stock prior to the paper making operation to treatment with chlorine to sterilize the stock, forming paper from the sterilized stock, and subjecting the white water from such paper making operation to coagulation and recovering the coagulated product in the form of a stable, sterilized product.

2. The improvement in the operation of paper mills which comprises subjecting the stock before it goes to the paper making machine to treatment with chlorine to give a stock having a residual chlorine content of about 0.5 to 1 part per million in the fibre-water mixture going to the paper machine, forming paper from the treated stock, and subjecting the white water therefrom to coagulation to form a stable, coagulated product and recovering the coagulated product from the white water.

3. The improvement in the operation of paper mills which comprises subjecting the stock before it goes to the paper machine to treatment with chlorine to give a sterilized stock, forming paper therefrom, subjecting the resulting white water to coagulation to separate therefrom a stable, coagulated, slime-free product and returning the separated product to the stock in the manufacture of paper in the mill.

4. The improvement in the treatment of white water which comprises forming a white water having a residual chlorine content of about 0.5 to 1 part per million, subjecting such white water to coagulation to give a stable, sterilized product, and separating the coagulated product from the white water.

5. The improvement in the treatment of white water which comprises subjecting white water having a residual chlorine content of about 0.5 to 1 part per million to a coagulating treatment.

6. The improvement in the treatment of white water which comprises subjecting white water having a residual chlorine content of about 0.5 to 1 part per million to coagulation with regulation of the pH value of the white water so that the pH value is around 5 to 6.

7. The improvement in the operation of paper mills which comprises subjecting white water having a residual chlorine content of about 0.5 to 1 to coagulation, separating the coagulated material from the white water, adding the coagulated material to other pulp to form the stock flowing to the paper machine, and forming paper from the resulting stock containing such coagulated material.

8. The improvement in the operation of paper mills which comprises subjecting pulp flowing to the paper machine to treatment with chlorine and subjecting any water subsequently added to the pulp to treatment with chlorine to give a stock having a residual chlorine content of about 0.5 to 1 as it goes to the paper machine, forming paper from such pulp and treating the white water therefrom with a coagulant to separate a stable, coagulated material therefrom.

9. As a new product a stable, sterilized, short fibre-containing, coagulated product recovered by coagulation of slime-free white water.

10. As a new product a stable, sterilized, short fibre-containing, coagulated product recovered by coagulation of chlorine-containing white water, such product being of a stable character and having a residual chlorine content.

In testimony whereof we affix our signatures.

DONALD K. PATTILLO.
JAMES H. MacMAHON.